US008661352B2

(12) United States Patent
Gronow et al.

(10) Patent No.: US 8,661,352 B2
(45) Date of Patent: Feb. 25, 2014

(54) METHOD, SYSTEM AND CONTROLLER FOR SHARING DATA

(75) Inventors: Brett James Gronow, Fitzroy (AU); Keith David Deverell, Collingwood (AU); Jonathan David Pak, Fitzroy North (AU); Christopher Glendon Bates, Box Hill North (AU); David Peter Wolf, Northcote (AU)

(73) Assignee: Someones Group Intellectual Property Holdings PTY Ltd (AU)

( * ) Notice: Subject to any disclaimer, the term of this patent is extended or adjusted under 35 U.S.C. 154(b) by 0 days.

(21) Appl. No.: 13/500,721

(22) PCT Filed: Oct. 7, 2010

(86) PCT No.: PCT/AU2010/001314
§ 371 (c)(1),
(2), (4) Date: Apr. 6, 2012

(87) PCT Pub. No.: WO2011/041836
PCT Pub. Date: Apr. 14, 2011

(65) Prior Publication Data
US 2012/0194465 A1    Aug. 2, 2012

(30) Foreign Application Priority Data
Oct. 8, 2009  (AU) ................................ 2009904889

(51) Int. Cl.
G06F 3/00      (2006.01)
G06F 15/177    (2006.01)
G06F 3/033     (2013.01)
G06F 3/14      (2006.01)
H04W 24/00     (2009.01)

(52) U.S. Cl.
USPC ........... 715/753; 715/734; 715/748; 715/863; 715/864; 455/456.1

(58) Field of Classification Search
None
See application file for complete search history.

(56) References Cited

U.S. PATENT DOCUMENTS

| 6,337,698 | B1 * | 1/2002 | Keely et al. ............... 715/823 |
| 6,396,475 | B1 * | 5/2002 | Ellenby et al. ............ 345/156 |
| 7,031,875 | B2 * | 4/2006 | Ellenby et al. ............ 702/150 |
| 7,242,389 | B1 | 7/2007 | Stern |
| 7,284,203 | B1 * | 10/2007 | Meeks et al. ............. 715/751 |

(Continued)

FOREIGN PATENT DOCUMENTS

AU    2011101085 B2    9/2011

OTHER PUBLICATIONS

Australian Patent Office, International Search Report and Written Opinion on PCT/AU2010/001314, Dec. 7, 2010, Woden Act 2606, Australia.

(Continued)

*Primary Examiner* — Stephen Alvesteffer
(74) *Attorney, Agent, or Firm* — Katten Muchin Rosenman LLP

(57) ABSTRACT

A method is provided for a user of a communications device sharing data items with one or more of a plurality of data recipients, comprising the steps of: selecting one or more data items to share (1201); displaying symbols in a two-dimensional geometrical space on a display (1204), at least some of which represent individuals or groups of the data recipients; selecting one or more of the symbols as destinations for the data item(s) (1202); and sharing the data item(s) with the destination (s) (1203).

17 Claims, 19 Drawing Sheets

(56) References Cited

U.S. PATENT DOCUMENTS

| | | | |
|---|---|---|---|
| 8,312,392 B2* | 11/2012 | Forutanpour et al. | 715/863 |
| 2001/0003189 A1* | 6/2001 | Miyazawa et al. | 709/206 |
| 2002/0158904 A1* | 10/2002 | Gunter et al. | 345/755 |
| 2007/0146347 A1* | 6/2007 | Rosenberg | 345/173 |
| 2009/0019141 A1* | 1/2009 | Bush et al. | 709/223 |
| 2009/0088183 A1* | 4/2009 | Piersol et al. | 455/456.1 |
| 2009/0106671 A1 | 4/2009 | Olson et al. | |
| 2009/0251559 A1* | 10/2009 | Mekenkamp et al. | 348/222.1 |
| 2009/0293012 A1* | 11/2009 | Alter et al. | 715/810 |
| 2010/0208033 A1* | 8/2010 | Edge et al. | 348/46 |
| 2011/0010676 A1* | 1/2011 | Khosravy et al. | 715/863 |

OTHER PUBLICATIONS

Australian Patent Office, file wrapper for Australian application No. 2011101085, a divisional of PCT/AU2010/001314, examined and certified for patent term beginning Oct. 7, 2010, includes AU office action prior to the "Decision to Grant a Patent" beginning on p. 48 of 129, Woden Act 2606, Australia.

\* cited by examiner

METHOD, SYSTEM AND CONTROLLER FOR SHARING DATA

FIELD

The present invention relates to a computerized method, system and controller for sharing data items between a group of users.

BACKGROUND TO THE INVENTION

The sharing of digital information between people is a ubiquitous feature of the computer age. With the advent of personal always-on mobile devices and massive reductions in costs per byte and increases in bandwidth, the popularity of sharing large data items electronically between groups of people has grown. While the shared data items are typically of a personal character such as photos shared between friends and family, the uses of widespread data sharing extend to all aspects of human endeavour including, commercial, professional and military.

Paradigms for interfacing the sharing and transfer of data between people are still largely based on personal computer software models such as email programs whereby a user sends a message with or without attachments to another user or a plurality of users on a distribution list. Email interfaces typically display messages received or sent in a scrollable list, and the selection of recipients is accomplished by selecting the recipients from another scrollable list. SMS text messaging, while confined mainly to operation on small hand held devices, follows the list-based email model.

There is a growing need for a more intuitive user-friendly and informal interface for sharing data items between uses, in particular one which is best suited to the common situation of communication between a small group of individuals.

The inventors of the current invention have found a much improved method of interfacing the sharing of data items between individuals, that exploits the natural attraction to representations of spatial location and is particularly suited to touch screens.

SUMMARY OF THE INVENTION

According to a first aspect of the invention there is provided a method for a user of a communications device sharing data items with one or more of a plurality of data recipients, comprising the steps of:
  selecting one or more data items to share;
  displaying symbols in a two-dimensional geometrical space on a display, at least some of which represent individuals or groups of the data recipients;
  selecting one or more of the symbols as destinations for the data item(s); and
  sharing the data item(s) with the destination(s).

In one embodiment, at least one of the symbols represents a data recipient that is another person or group of people accessing another communications devices.

In one embodiment, at least one of the symbols represents a data recipient that is virtual or actual storage location that can be accessed by another person via a respective communications device. The virtual or actual storage location may be a virtual gallery, library, parcel or post box.

In one embodiment, the step of sharing may comprise a notification to an intended recipient that access is granted to the data item(s). Alternatively or in addition, the step of sharing may comprise a transfer to a data memory of an intended recipient of at least a readable version of the data item(s).

In one embodiment, the display is a touch sensitive screen and the step of selecting one or more of the symbols comprises touching each of the symbols. In another embodiment, the display is a touch sensitive screen and the step of selecting comprises the user touching a centre part of the screen representing themself with a finger and flicking or sliding the finger towards or to the symbol In one embodiment, the step of displaying symbols in a two dimensional space comprises positioning one or more of the symbols in the space so as to reflect a physical or notional two dimensional spatial location of the data recipient represented by the symbol. Where the location is a physical location it may be represented as a position on a map.

In one embodiment, the communications device has sensors enabling computation of a physical spatial orientation of the device, and the step of displaying comprises moving the positions of the symbols on the display as the physical spatial orientation changes so as to maintain a correspondence of the two dimensional spatial location with physical space. The step of selecting a symbol may comprise holding the device in a spatial orientation so that the symbol appears in an autoselect position on the display.

In one embodiment, the method further comprises the step of displaying images associated with the symbols as if hanging in 3-dimensional physical space if the user moves the device orientation away from a generally horizontal plane, so that display appears to be a window into the 3-dimensional physical space around the user. The device may have a camera on a back face thereof and the associated images may be displayed on a background of the camera image so as to provide an augmented reality effect.

According to a second aspect of the invention there is provided a system to enable a user to share data items with one or more of a plurality of data recipients, comprising
  a communications device having a user interface including a display;
  a data item selector for selecting one or more data items to share;
  a symbol display controller for displaying symbols in a two-dimensional geometrical space on the display, at least some of which represent individuals or groups of the data recipients;
  a destination selector selecting one or more of the symbols as destinations for the data item(s); and
  a data sharer for sharing the data item(s) with the destination(s).

According to a third aspect of the invention there is provided a controller to enable a user of a communications device having a user interface including a display to share data items with one or more of a plurality of data recipients, comprising
  a data item selector for selecting one or more data items to share;
  a symbol display controller for displaying symbols in a two-dimensional geometrical space on the display, at least some of which represent individuals or groups of the other data recipients;
  a destination selector selecting one or more of the symbols as destinations for the data item(s); and
  a data sharer for sharing the data item(s) with the destination(s).

According to a fourth aspect of the invention there is provided computer program code which when executed by a computing device causes the computing device to implement the method of the first aspect of the invention.

According to a fifth aspect of the invention there is provided a computer readable medium comprising the program code of the fourth aspect of the invention.

According to a sixth aspect of the invention there is provided a data signal comprising the computer program code of the fourth aspect of the invention.

DETAILED DESCRIPTION OF EMBODIMENTS

Figure 1:
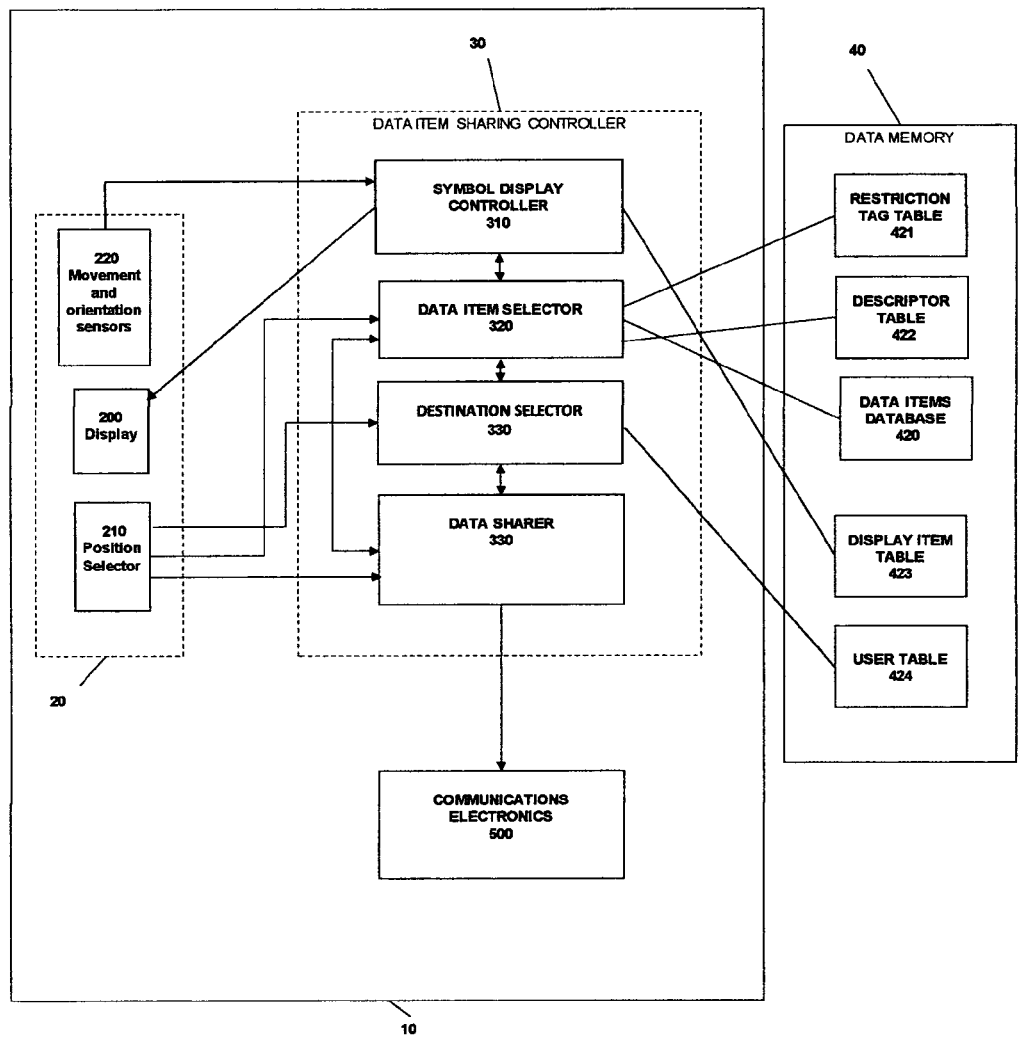
FIG. 1 is a block diagram of an example data item sharing system of the current invention.

Referring to the drawings, there is shown various aspects of a data sharing system, controller and method according to an embodiment of the invention.

The system may take a number of different forms. In a preferred form, the use interface is provided by a touch screen display and the data is communicated between the users by wireless means. In a second form, the interface may be provided by a computer screen, keyboard and mouse and the data may be communicated by fixed line facilities.

A typical implementation of the preferred form involves a personal mobile device with touch screen interface such as an Apple® iPhone®, comprising optionally position and orientation sensing capabilities such as can be provided by one or more sources such as GPS, accelerometers, magnetometers, wireless triangulation, optic flow software, also optimally comprising a camera, and having access to wireless data transmission capabilities such as a commonly provided over the mobile phone network or WiFi networks. The data items will typically be stored on the mobile device but also commonly stored remotely from the users.

Referring now to FIG. 1, the core components at the broadest level are the data item sharing system 10 comprising a user interface 20 and a data item sharing controller 30, communicating with a data memory 40 which may be located either locally and/or remotely. In one embodiment data memory 40 includes a data items database 420, descriptor table 422 and restriction tag table 421.

Components of the user interface 20 include a display 200 such as an LCD screen and a position selector 210 such as touch sensors on the display 200 to provide touch screen functionality. Also provided in this typical mobile implementation are movement and orientation sensors 220 such as an accelerometer and magnetometer which can be used in conjunction with GPS or other positioning information to provide an absolute position and orientation for the mobile device.

The data item sharing controller 30 is in data communication with the user interface 20 and data memory 40 and typically contains or is implemented in software on a processor, typically the CPU of the mobile device. Herein the term "processor" is used to refer generically to any device that can perform this function and may include: a microprocessor, microcontroller, programmable logic device or other computational device, a general purpose computer (e.g. a PC) or a server.

For the sharing of media data items, data items database 420 may be accompanied as is known in the art by a restriction tag table 421 to assist searching and selection, typically containing textual or binary content-based information in relation to each media item, but may also contain some native media information such as media type (e.g. colour/B&W). Data memory 40 may also contain descriptor table 422 of derived descriptors for each media item as described herein which typically originate from native audiovisual descriptors but may also originate from content-based information.

Data memory 40 also contains user table 424 having data relating to each user such as names, electronic addresses or phone numbers and access privileges and display item table 423 containing a list of items for display, their actual geographical position if known and/or relevant and their positions and associated symbols on a two-dimensional region of display 200, which represents a geometrical space and may reflect geographical position. This list of items for display typically includes user symbols indicating different users, and also data item symbols indicating data items that may be shared with the users.

Display item table 423 and user table 424 will typically include data, such as the geographical location of the other recipients (where the recipients are physical people), which is updated continually over the internet via communications electronics 600 from a coordinating program on a server which the other recipients' devices are also in contact. This data may alternatively or in addition be updated via direct connection between two or more users, using any appropriate wireless mode of communication such as Bluetooth.

Data memory 40 further may contain map data that may enable display of the data recipients in a map to indicate actual position in a city.

Data item sharing controller 30 has symbol display controller 310 for positioning symbols on display 200. The symbols include recipient symbols indicating individuals or groups of the recipients, data item symbols indicating individual data items or collections thereof, and data receptacle symbols indicating a virtual parcel, gallery, post box or library that can be accessed by users. Data item sharing controller 30 also has data item selector 320 for selecting one or more data items to share, destination selector 330 for selecting one or more destinations of the data items, and data sharer 340 for effecting transfer or sharing of the data items to the destinations via communicator 500. Sharing may comprise a transfer to a data memory owned by an intended recipient of a copy of the data item(s), or simply recording of the recipient in a list of approved recipients to be granted access to the data item.

Figure 2:
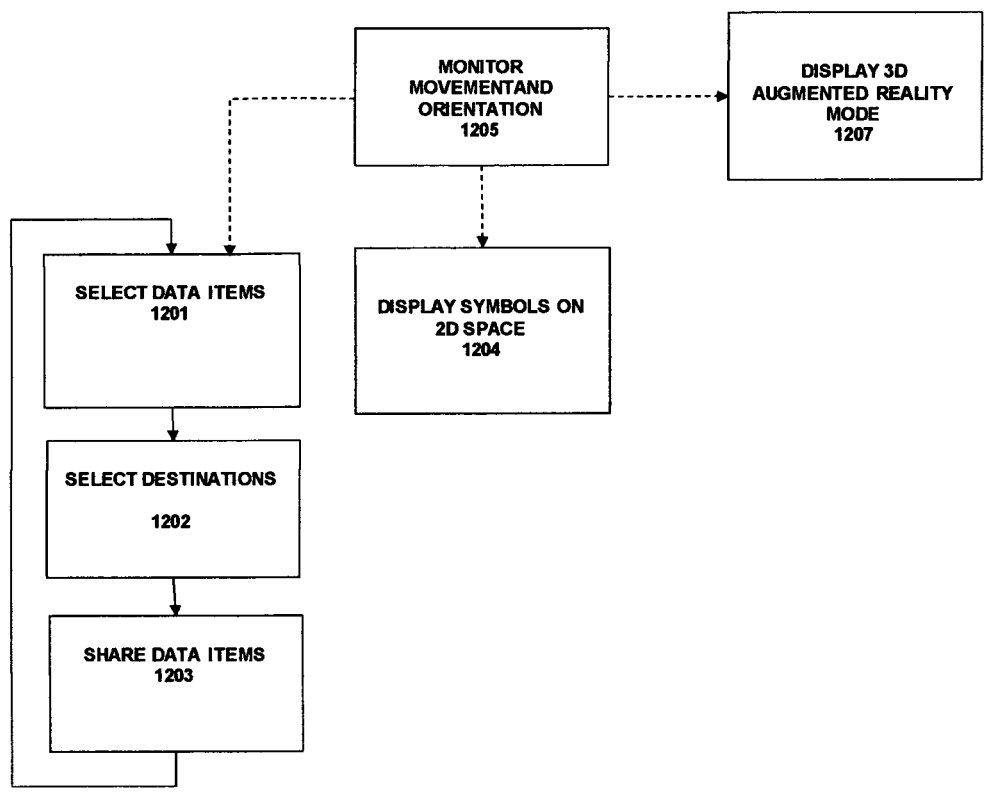
FIG. 2 shows a flow diagram for the method of interfacing the sharing of data items of an embodiment of the current invention.

Referring now to FIG. 2, one embodiment of the method aspect of the invention is depicted in a flow diagram.

In steps 1201, 1202 and 1203, actions performed by the user are to select data items, select destination symbols and then to share the data items with one or more of the data recipients represented by the destination symbols. In step 1205, the system continually monitors the movement and orientation of the touch screen. This monitoring is performed by the accelerometer, which detects both movement and the gravitational field, and the magnetometer, which detects the earth's magnetic field and hence orientation of the touch sheen with respect to local geography. While the touch screen is held generally horizontal such as would be parallel to the surface of a table, the system maintains the symbols in a two dimensional geometrical space (step 1204). In this mode, if the touch screen is reoriented, the symbols may be moved on the display as the physical spatial orientation changes so as to maintain a correspondence of the two dimensional spatial location with physical space. If the touch screen is held away from a horizontal plane, the system enters a 3D augmented reality mode (step 1207), where the camera of the phone is used to superimpose a real-time image of the view behind the screen with representation of the symbols as if hanging in space. If the symbol is a user, personal details may appear. It the symbol represents a data item, details of the data item may be shown, such as a still from a movie.

Figure 3:
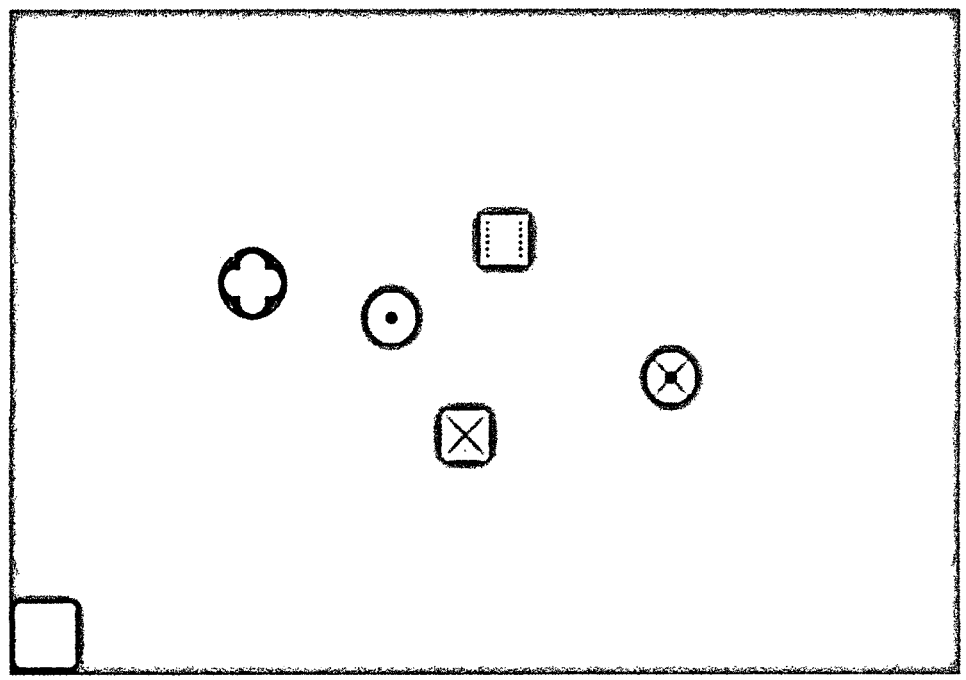
FIGS. 3-14 show displays in a sharing session according to an embodiment of the current invention.

Now referring to FIG. 3, an example two-dimensional geometrical space is shown, while the touch screen is held horizontally. The system is implemented as an application on an iPhone. The centre of the screen is to be considered the position of the user of the device, with the "up" direction on the screen representing the space in front of the user.

The five symbols shown represent either physical objects such as a user or data objects notionally located in the geometrical space. The flower-like symbol is another user, who is registered as in data communication with the user and whose position in space is in front of the user and to the left. This example contemplates that the two users are in the same room, but analogous examples can involve users in the same or different cities, for which the position on the screen can be referred to a physical map, or for which the position on the screen is purely notional. The user is able to detect presence with other users by communication with a server. This is achieved via Global Navigation Satellite System (via GPS, GLONASS, Galileo, or other similar satellite system) or assisted GNSS, where the geospatial location of a device is ascertained with reduced error via contact with other wireless transcievers (such as in a Differential GPS or Real Time Kinematic system), deadreckoning via motion sensor, orbital extensions, or contact with other GPS enabled devices and their respective location estimates (short-baseline RTK) or fixed WiFi transceivers. An alternative means of detecting presence of other users could be via a scanner in the mobile device itself (via as an RFID scanner or Ultra Wide Band radar, or similar technology).

The other symbols represent data items that are notionally located in the space and which the other user is potentially also able to view on his or her screen and are "shared". The circular symbol represents an audio file, the film symbol represents a video or movie, the Square symbol with diagonals represents an image and the circular symbol with an X superimposed represents a parcel such as a collection of media items which may be of different types.

Figure 4:
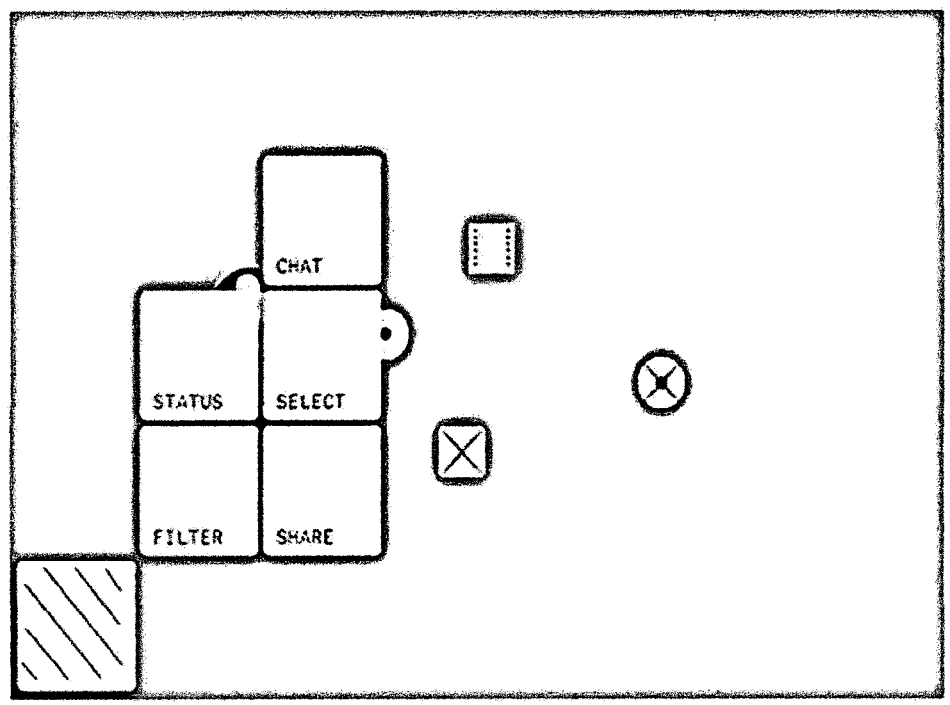
Figure 5:
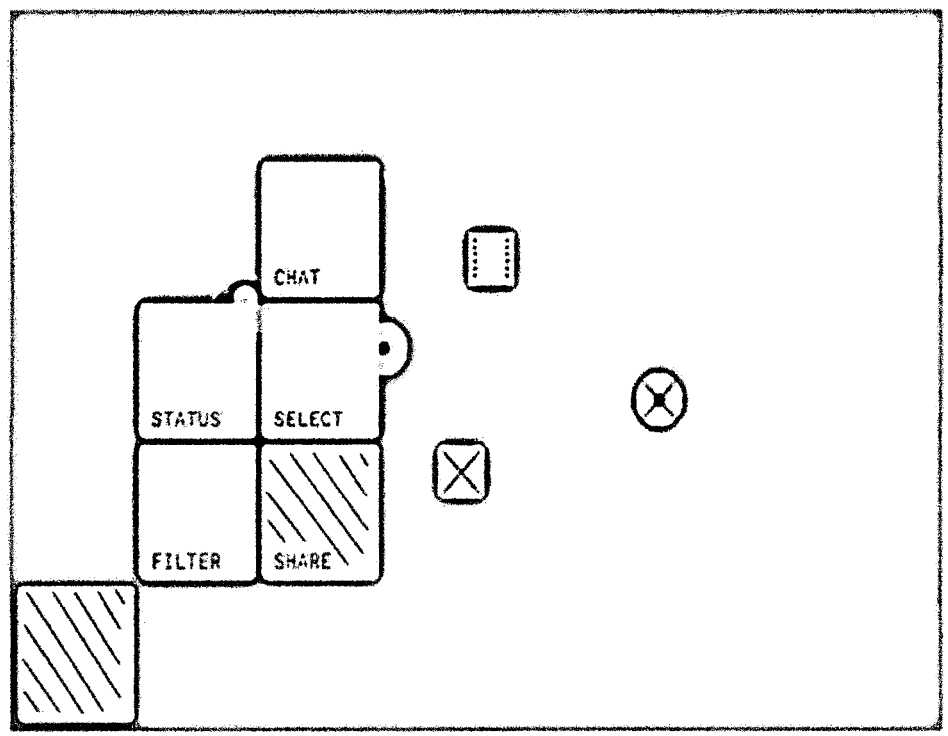
Figure 6:
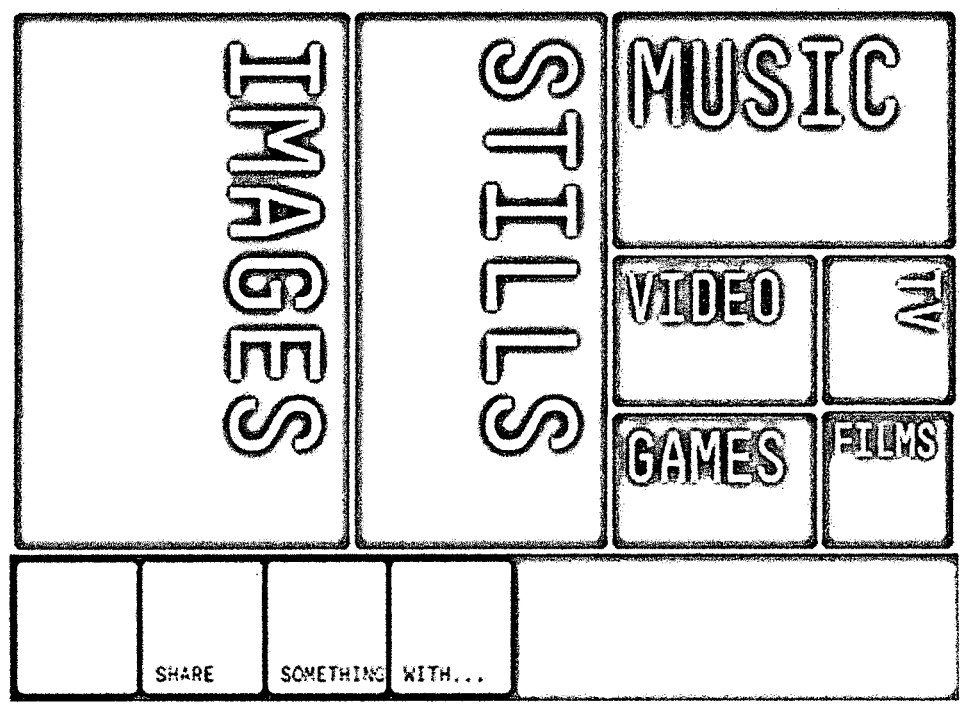
Figure 7:
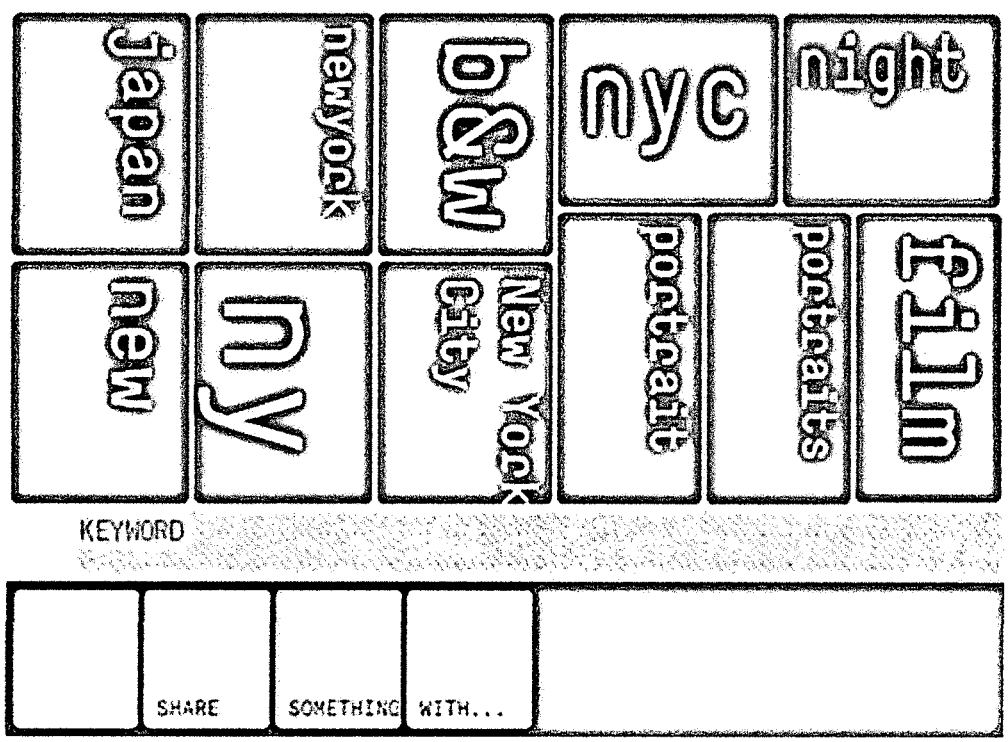
Figure 8:
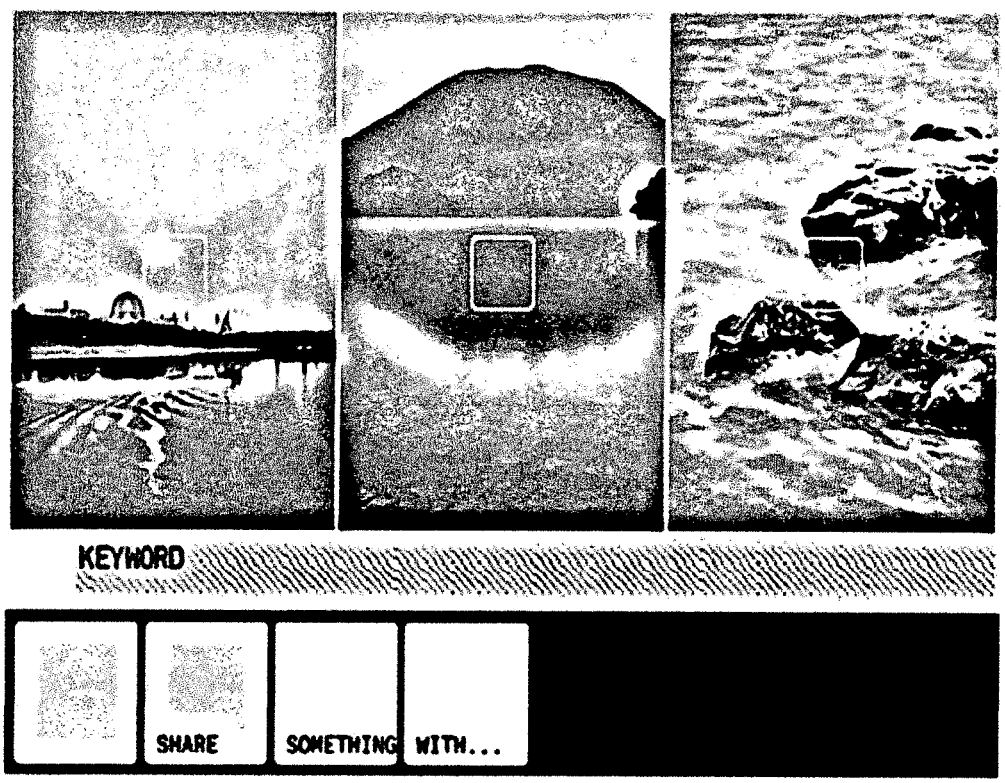
Figure 9:
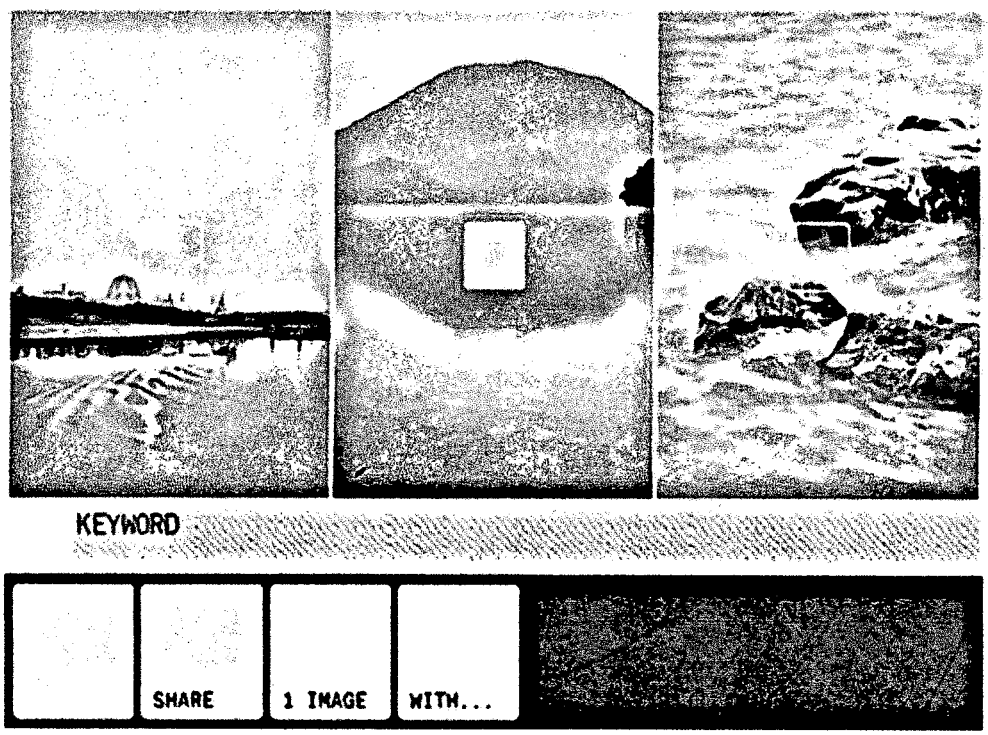

FIG. 4 shows the screen after the user has touched the square function button in the bottom left. The function button becomes coloured and five option buttons appear. One of these is labelled "SHARE" and the user touches it which in FIG. 5 becomes coloured. FIG. 6 shows the screen that now appears, with a breadcrumb trail developing along the bottom and in the body of the screen are labelled regions representing categories of data items in the user's possession. The user touches "IMAGE," and a in FIG. 7 a new screen appears with sub-categories and a section for a keyword tag if desired. The user touches "Japan" and as shown in FIG. 8 three stored photographs appear with selection buttons in the centre of each. The user touches the centre image selection button which becomes coloured as seen in FIG. 9. The step of data item selection is now complete.

Figure 10:
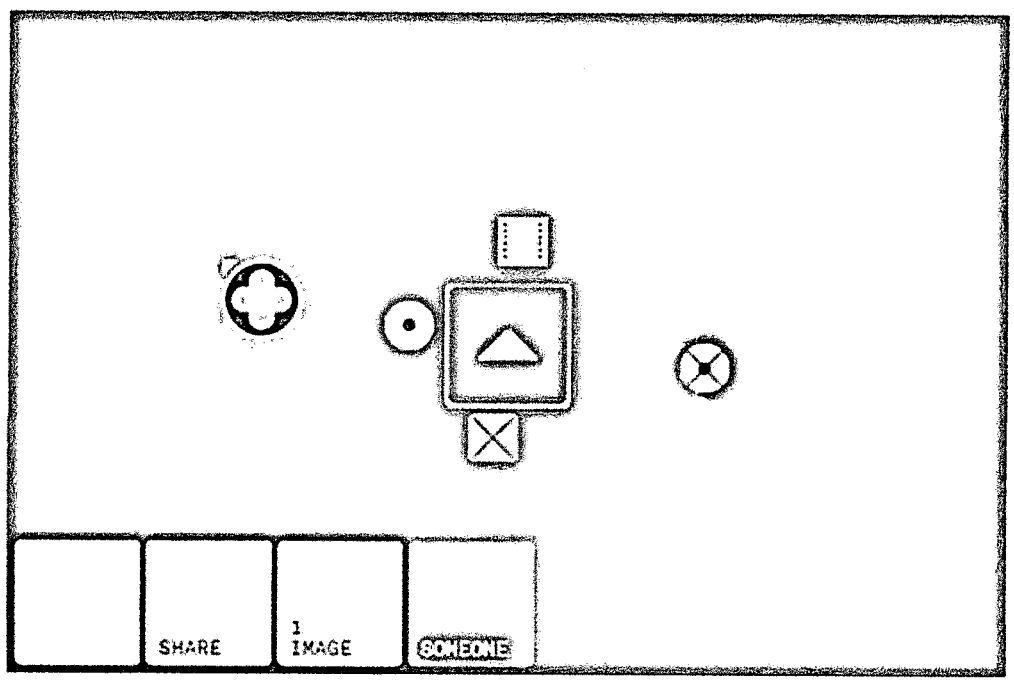
Figure 11:
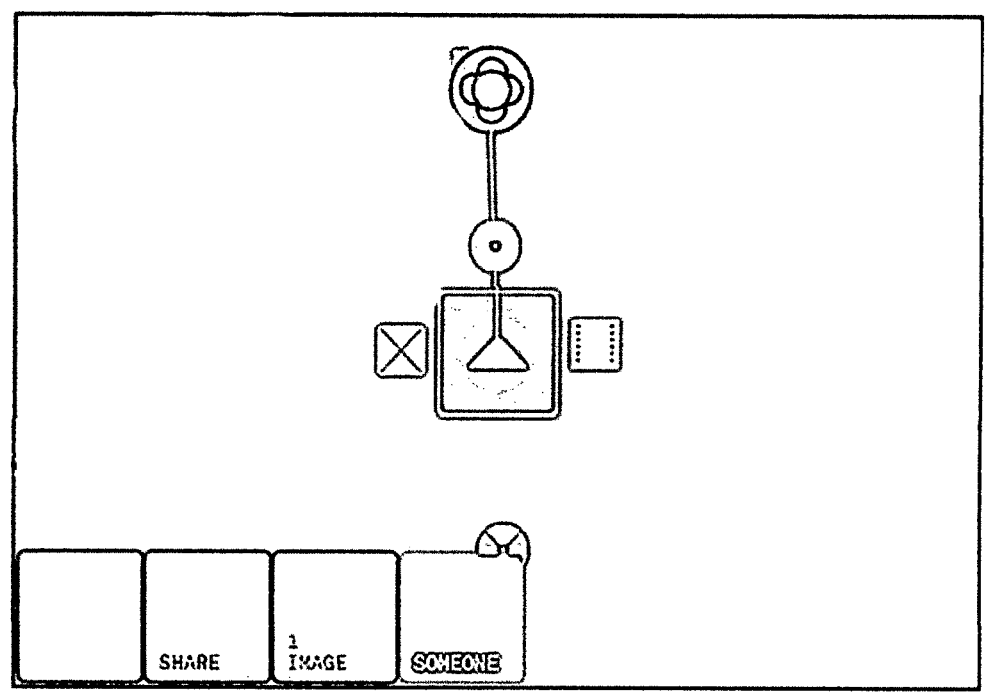
Figure 12:
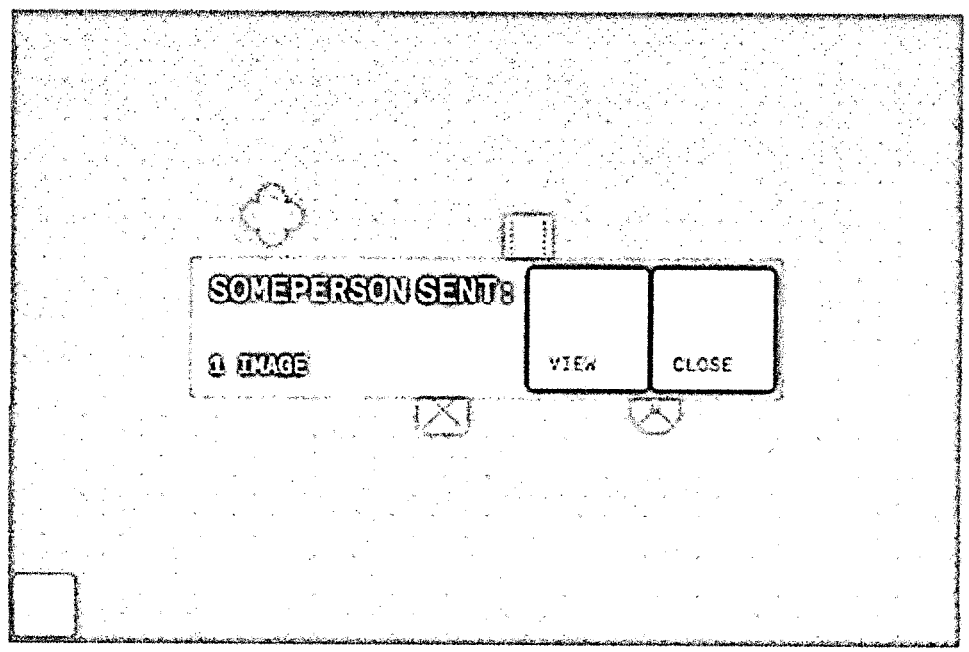
Figure 13:
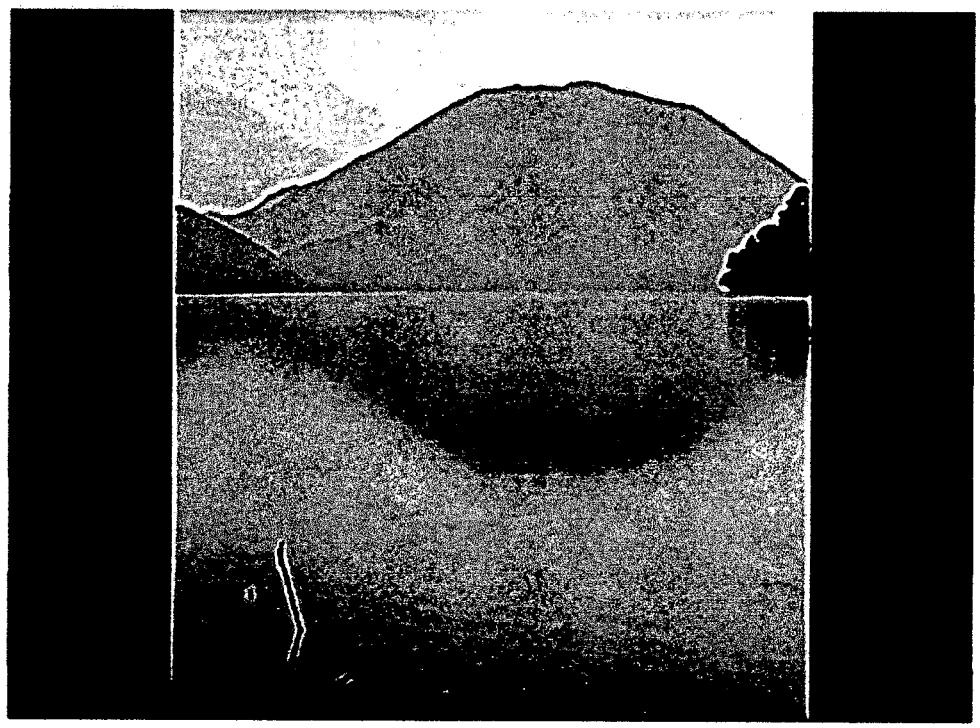
Figure 14:
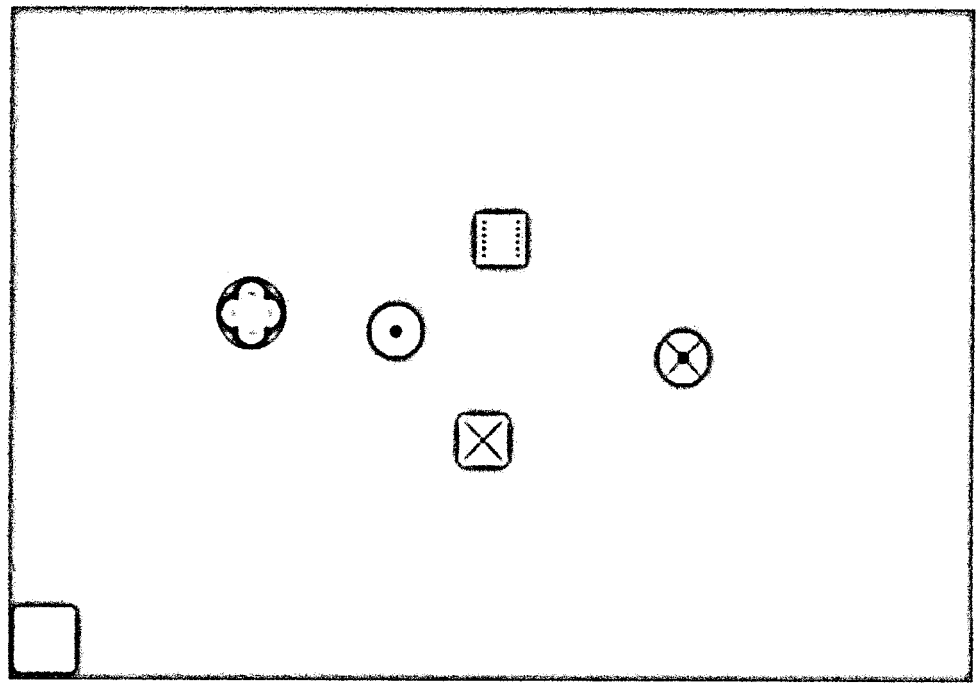
Figure 15:
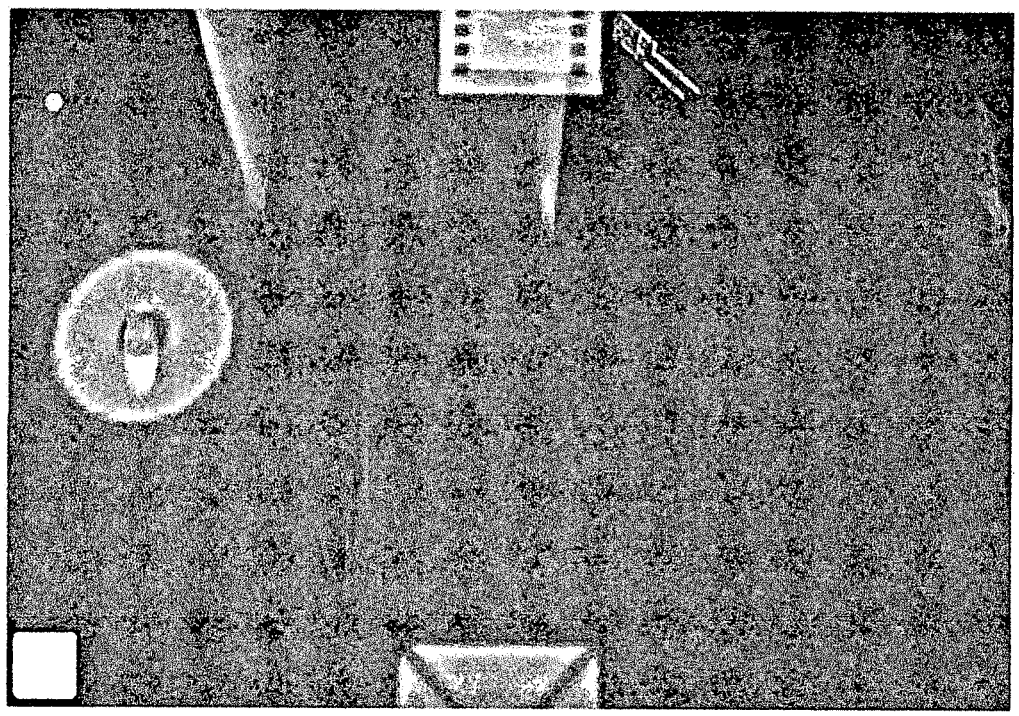
FIGS. 15-19 show the operation of an additional option feature of the invention enabling a three-dimensional augmented reality.

FIG. 10 shows that the two-dimensional symbol screen now reappears with a symbol for the image to be shared in the centre (square with upwards pointing arrow). Optionally the image itself may appear in the background. In order for the recipient "someone" represented by the flower symbol to be selected, the user turns to the left and in response to magnetometer signals the symbols rotate on the screen until as shown in FIG. 11 the flower symbol appears at the top of the screen when the recipient "someone" is in front of the user. In this case "someone" is an actual person accessing a respective device. A line connects the centre of the screen and the flow symbol, as an aid to unambiguous selection. The user now uses a flicking gesture from the centre of the screen towards the flower symbol to indicate selection of the destination, which is shown confirmed in FIG. 12, where the option to view the data item is offered. If this option is touched, the data item is displayed in full screen as shown in FIG. 13. Touching the screen returns to the two-dimensional symbol view again in FIG. 14 (the user has turned back to the original orientation, with "someone" to the left).

Figure 16:
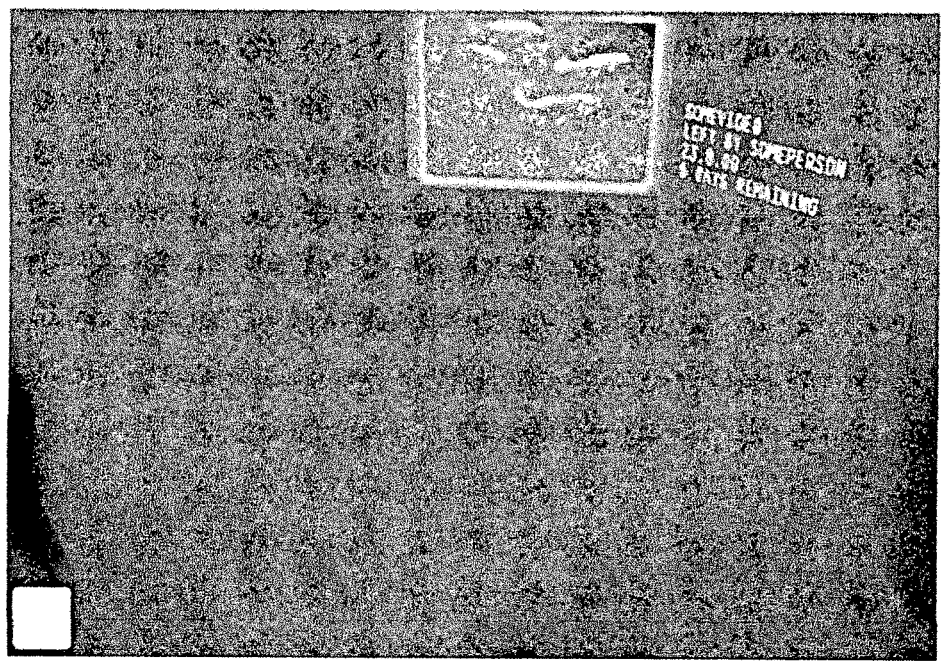
Figure 17:
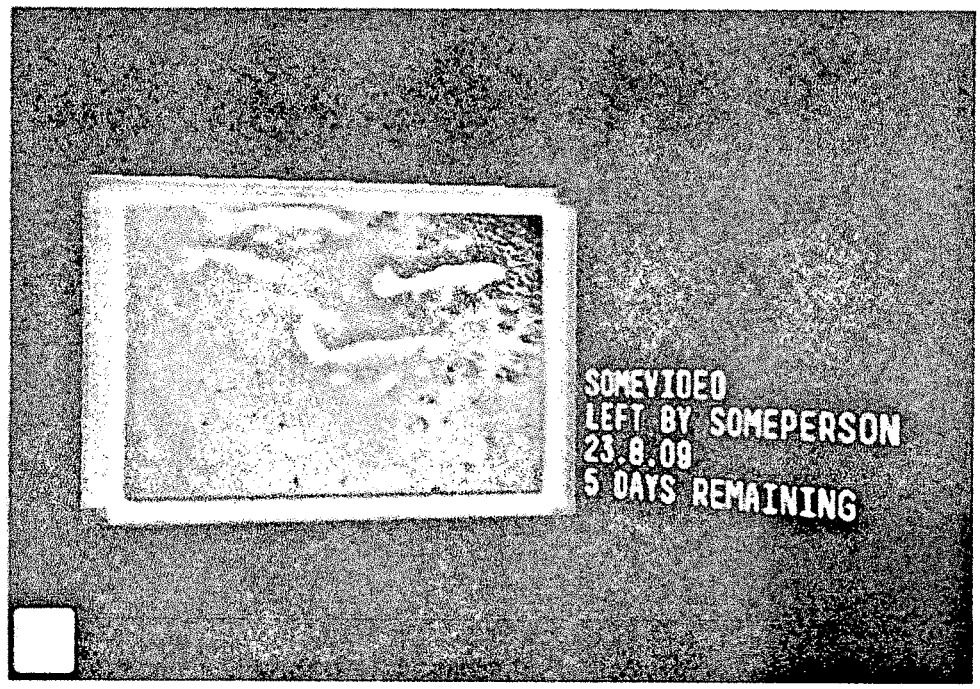
Figure 18:
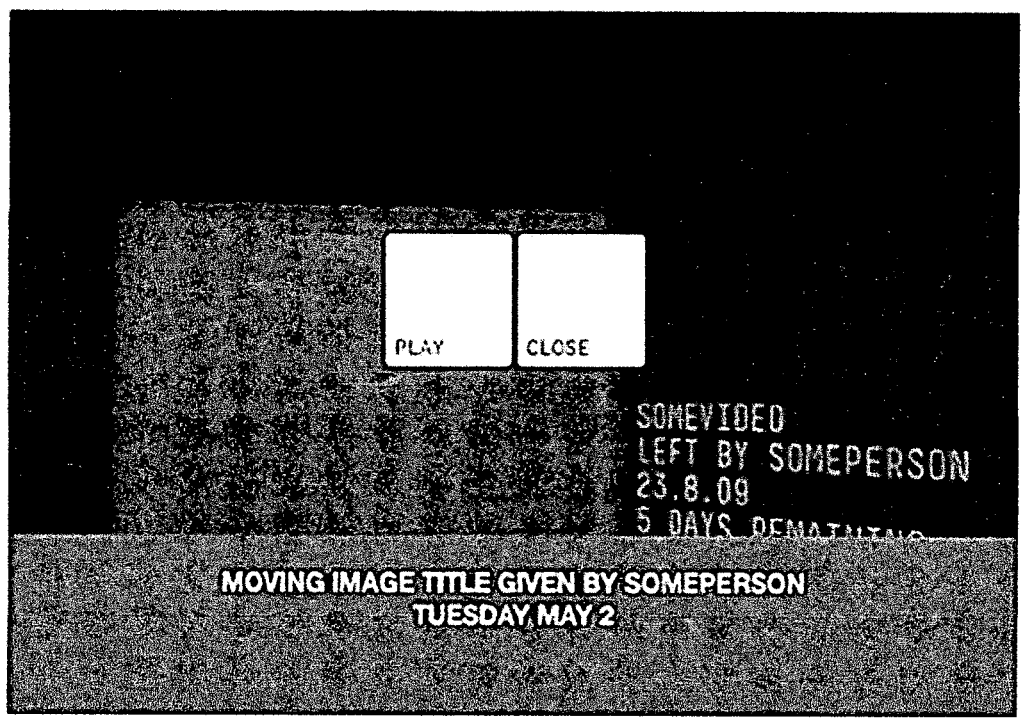
Figure 19:

Now referring to FIGS. 15 to 19, operation of the 3-D augmented reality mode will be demonstrated. From the display of FIG. 14, the user lifts the touch screen up to view the scene in front. The camera turns on and the various symbols can be viewed in FIG. 15 as if hanging in space in front of the real scene. In FIG. 16, when the user has tilted the screen all the way to vertical, the contents of the film symbol can be seen hanging in space. As the user changes orientation, so the film object moves on the screen to give the augmented reality perception of a film object in physical space, shown when fully centred on the screen in FIG. 17. Touching the object allows playing of the video, as shown in FIG. 18 and FIG. 19.

Persons skilled in the art will also appreciate that many other variations may be made to the invention without departing from the scope of the invention.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

Further, recitation of the method steps in a particular order does not imply serial performance unless the context requires. In particular, the displaying and selecting steps of the current invention typically occur in parallel.

Further still, the term "communications device" encompasses any device capable of sending a data communication in any form and includes an internet-connected desktop computer as well as a wireless enabled PDA or telephone.

It is to be understood that, if any prior art publication is referred to herein, such reference does not constitute an admission that the publication forms a part of the common general knowledge in the art, in Australia or any other country.

The invention claimed is:

1. A method for a user of a communications device to share a data item with one or more of a plurality of data recipients, being other persons or groups of people accessing other communications devices in direct wireless communication with the user, the method comprising the steps of:

selecting one or more data items to share;

displaying symbols in a two-dimensional geometrical space on a touch-sensitive display of the communications device, each symbol comprising a representation of an individual or group of the data recipients, one or more of the symbols being positioned so as to reflect a physical or notional location relative to the user of the individual or group represented by said symbol;

selecting one or more of the symbols as a destination for the one or more data items by pointing the communications device at the intended recipient that is represented by the corresponding symbol, wherein the step of selecting one or more of the symbols further includes holding the display in a vertical orientation so that any selected symbol appears in an autoselect position on the display; displaying images associated with the symbols as if hanging in 3-dimensional physical space if the user moves the physical spatial orientation of the device away from a generally horizontal plane, so that display appears to be a window into the 3-dimensional physical space around the user; and sharing the data item with the pointed-at intended recipient by the user (i) touching with a finger a central portion of the touch-sensitive display which represents said user, and (ii) flicking or sliding the finger towards or to the symbol of the pointed-at intended recipient.

2. The method as claimed in claim 1, wherein at least one of the symbols represents a data recipient that is a virtual or actual storage location that can be accessed by another person via another communications device.

3. The method as claimed in claim 2, wherein the virtual or actual storage location is selected from the group consisting of a virtual gallery, a library, a parcel and a post box.

4. The method as claimed in claim 1, wherein the step of sharing comprises notifying an intended recipient that access is granted to the data item.

5. The method as claimed in claim 1, wherein the step of sharing comprises a transfer to a data memory of an intended recipient of at least a readable version of the data item.

6. The method as claimed in claim 1, wherein the display comprises is a touch sensitive screen, and wherein the step of selecting one or more of the symbols comprises touching each of the symbols.

7. The method as claimed in claim 1, wherein the step of displaying symbols in a two dimensional space comprises positioning one or more of the symbols in the space so as to reflect a physical or notional two dimensional spatial location of the data recipient represented by the symbol.

8. The method as claimed in claim 7, wherein the communications device comprises sensors enabling computation of a physical spatial orientation of the device, and wherein the step of displaying comprises moving the positions of the symbols on the display as the physical spatial orientation changes so as to maintain a correspondence of the two dimensional spatial location with physical space.

9. The method as claimed in claim 7, wherein the location comprises a physical location and is represented as a position on a map.

10. The method as claimed in claim 1, wherein the device has a camera on a back face thereof and further comprising the step of displaying the images associated with the symbols on a background of a second image on the camera image so as to provide an augmented reality effect.

11. At least one processor containing program code which, when executed by the at least one processor causes the at least one processor to perform the method of claim 1.

12. A computer readable, non-transitory medium storing the program code of claim 11.

13. The method as claimed in claim 1, wherein selection of a symbol is indicated by automatically displaying a line between a symbol of the user and the symbol of the pointed-at recipient, on the device display.

14. The method as claimed in claim 1, wherein the displaying step further comprises:
    displaying a symbol of a video on the display;
    when the display is moved to a vertical orientation, changing the symbol of the video into video content corresponding to the video symbol; and
    as the device is rotated horizontally, moving a position of the displayed video content on the display.

15. A system to enable a user to share data items with one or more of a plurality of data recipients, being other persons or groups of people accessing other communications devices in direct wireless communication with the user, the system comprising:
    a communications device having a user interface including a touch-sensitive display;
    a data item selector for selecting one or more data items to share;
    a symbol display controller for displaying symbols in a two-dimensional geometrical space on the display, each symbol comprising a representation of an individual or group within the data recipients, one or more of the symbols being positioned so as to reflect a physical or notional location relative to the user of the individual or group represented by said symbol;
    a destination selector selecting one or more of the symbols as destinations for the one or more data items, the destination selector selecting a symbol by pointing the communications device at the intended recipient that is represented by the selected symbol, wherein the destination selector selects one or more of the symbols by holding the display in a vertical orientation so that any selected symbol appears in an autoselect position on the display;
    wherein the images associated with the symbols are displayed as if hanging in 3-dimensional physical space if the user moves the physical spatial orientation of the device away from a generally horizontal plane, so that display appears to be a window into the 3-dimensional physical space around the user; and
    a data sharer for sharing the one or more data items with the pointed-at intended recipient by the user (i) touching with a finger a central portion of the touch-sensitive display which represents said user, and (ii) flicking or sliding the finger towards or to the symbol of the pointed-at intended recipient.

16. The system as claimed in claim 15, wherein at least one data item selector, symbol display controller, destination selector and data sharer is implemented at least in part, by a processor executing code stored in a memory.

17. The system as claimed in claim 15, wherein the destination selector causes the selection of a symbol to be indicated by automatically displaying a line between a symbol of the user and the symbol of the pointed-at recipient, on the device display.

* * * * *